United States Patent
Fabjanski et al.

(10) Patent No.: US 10,339,152 B2
(45) Date of Patent: Jul. 2, 2019

(54) MANAGING SOFTWARE ASSET ENVIRONMENT USING COGNITIVE DISTRIBUTED CLOUD INFRASTRUCTURE

(71) Applicant: INTERNATIONAL BUSINESS MACHINES CORPORATION, Armonk, NY (US)

(72) Inventors: Krzysztof Fabjanski, Zdunow (PL); Marek Peszt, Cracow (PL); Agnieszka Tkaczyk, Cracow (PL); Piotr J. Walczak, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 282 days.

(21) Appl. No.: 15/250,433

(22) Filed: Aug. 29, 2016

(65) Prior Publication Data
US 2018/0060402 A1    Mar. 1, 2018

(51) Int. Cl.
*G06F 17/00*    (2019.01)
*G06F 16/25*    (2019.01)
(Continued)

(52) U.S. Cl.
CPC ............ *G06F 16/254* (2019.01); *G06F 16/22* (2019.01); *H04L 47/70* (2013.01); *H04L 67/10* (2013.01)

(58) Field of Classification Search
CPC .... G06F 17/30; G06F 17/30312; G06F 17/00; G06F 16/254; G06F 16/22
(Continued)

(56) References Cited

U.S. PATENT DOCUMENTS

| 7,904,894 B2 | 3/2011 | Entin et al. |
| 8,719,769 B2 | 5/2014 | Castellanos et al. |
| (Continued) | | |

FOREIGN PATENT DOCUMENTS

| CN | 102819589 | 12/2012 |
| CN | 104050042 | 9/2014 |
| CN | 104317928 | 1/2015 |

OTHER PUBLICATIONS

"IBM Endpoint Manager for Software Use Analysis, Version 9.x" Beat Documentation, pp. 1-448, relevant p. 19 (2002).

*Primary Examiner* — Isaac M Woo
(74) *Attorney, Agent, or Firm* — Tutunjian & Bitetto, P.C.; Jeffrey S. LaBaw (57) ABSTRACT

A method and system are provided for performing an extract-transform-load (ETL) process. The method includes collecting load information about a volume and a complexity of raw data to be processed during the ETL process. The method further includes receiving an expected completion time of the ETL process and execution information about (i) hardware resources and (ii) an influence of the hardware resource on an execution time of the ETL process. The method also includes calculating resources for a distributed processing software infrastructure to be used to perform the ETL process, by applying a statistical method to the load information, expected completion time, and execution information. The method additionally includes dynamically assigning cloud resources corresponding to and based on the calculated resources, in accordance with the expected completion time. The method further includes performing the ETL process on the raw data using the assigned cloud resources and storing ETL process results.

20 Claims, 6 Drawing Sheets

(51) Int. Cl.
*G06F 16/22* (2019.01)
*H04L 29/08* (2006.01)
*H04L 12/911* (2013.01)

(58) Field of Classification Search
USPC .................................................. 707/600–899
See application file for complete search history.

(56) References Cited

U.S. PATENT DOCUMENTS

| 8,996,588 B2 | 3/2015 | Ko et al. |
| 2014/0317617 A1 | 10/2014 | O'Donnell et al. |
| 2017/0161344 A1* | 6/2017 | Vasireddy ......... G06F 17/30563 |

\* cited by examiner

MANAGING SOFTWARE ASSET ENVIRONMENT USING COGNITIVE DISTRIBUTED CLOUD INFRASTRUCTURE

BACKGROUND

Technical Field

The present invention relates generally to information processing and, in particular, to managing a software asset environment using a cognitive distributed cloud infrastructure.

Description of the Related Art

In the majority of currently available software asset management tools, the centralized server is treated as the most important part of the software asset environment. Products such as Bigfix® Inventory rely on data gathered from all endpoints and stored in one place. To find relevant information about usage, Processor Value Units (PVUs) consumption and others, an Extract, Transform and Load (ETL) process is performed. Depending on the amount of data from the endpoints, this process can consume a lot of memory resources as well as take a lot of time. Also, all data is imported (from a specific point in time). The end user (software license administrator) has no influence on what data is imported and may not be able to accelerate the ETL process without upgrading system hardware.

SUMMARY

According to an aspect of the present invention, a method is provided for performing an extract-transform-load (ETL) process. The method includes collecting load information about a volume and a complexity of raw data to be processed during the ETL process. The method further includes receiving an expected completion time of the ETL process and execution information about (i) hardware resources and (ii) an influence of the hardware resource on an execution time of the ETL process. The method also includes calculating, by a processor, resources for a distributed processing software infrastructure to be used to perform the ETL process, by applying a statistical method to the load information, the expected completion time, and the execution information. The method additionally includes dynamically assigning cloud resources corresponding to and based on the calculated resources, in accordance with the expected completion time. The method further includes performing the ETL process on the raw data using the assigned cloud resources and storing results of the ETL process in a database.

According to another aspect of the present invention, a computer program product is provided for performing an extract-transform-load (ETL) process. The computer program product comprising a computer readable storage medium having program instructions embodied therewith. The program instructions are executable by a computer to cause the computer to perform a method. The method includes collecting load information about a volume and a complexity of raw data to be processed during the ETL process. The method further includes receiving an expected completion time of the ETL process and execution information about (i) hardware resources and (ii) an influence of the hardware resource on an execution time of the ETL process. The method also includes calculating, by a processor, resources for a distributed processing software infrastructure to be used to perform the ETL process, by applying a statistical method to the load information, the expected completion time, and the execution information. The method additionally includes dynamically assigning cloud resources corresponding to and based on the calculated resources, in accordance with the expected completion time. The method further includes performing the ETL process on the raw data using the assigned cloud resources and storing results of the ETL process in a database.

According to yet another aspect of the present invention, a system is provided for performing an extract-transform-load (ETL) process. The system includes a processor, configured to collect load information about a volume and a complexity of raw data to be processed during the ETL process. The processor is further configured to receive an expected completion time of the ETL process and execution information about (i) hardware resources and (ii) an influence of the hardware resource on an execution time of the ETL process. The processor is also configured to calculate resources for a distributed processing software infrastructure to be used to perform the ETL process, by applying a statistical method to the load information, the expected completion time, and the execution information. The processor is additionally configured to dynamically assign cloud resources corresponding to and based on the calculated resources, in accordance with the expected completion time. The system also includes a database configured to store results of the ETL process performed on the raw data using the assigned cloud resources.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

The present invention is directed to managing a software asset environment using a cognitive distributed cloud infrastructure.

The Extract, Transform and Load (ETL) process is crucial for Software Asset Management. The ETL process aggregates raw data such as information about hardware and software components, and creates correlated data picture that helps customers better understand what they have installed in their IT infrastructure. However, an ETL import conventionally takes a lot of time to complete and consumes a lot of hardware resources.

In an embodiment, a process is provided to facilitate the concept of a dynamically allocated distributed processing software such as Hadoop® to leverage the benefits of the Software as a Service (SaaS) ETL import.

In the first stage of the process, the asset management infrastructure collects information about the volume of raw data that needs to be processed during the ETL. Such information allows for allocating a certain amount of distributed infrastructure resources (nodes, HDFS storage) which will perform the ETL.

In the next step, data is already inserted into the BigSql database from which we can extract additional information regarding aggregated data. This leverages the calculation that needs to be done during every new ETL import.

Figure 1:
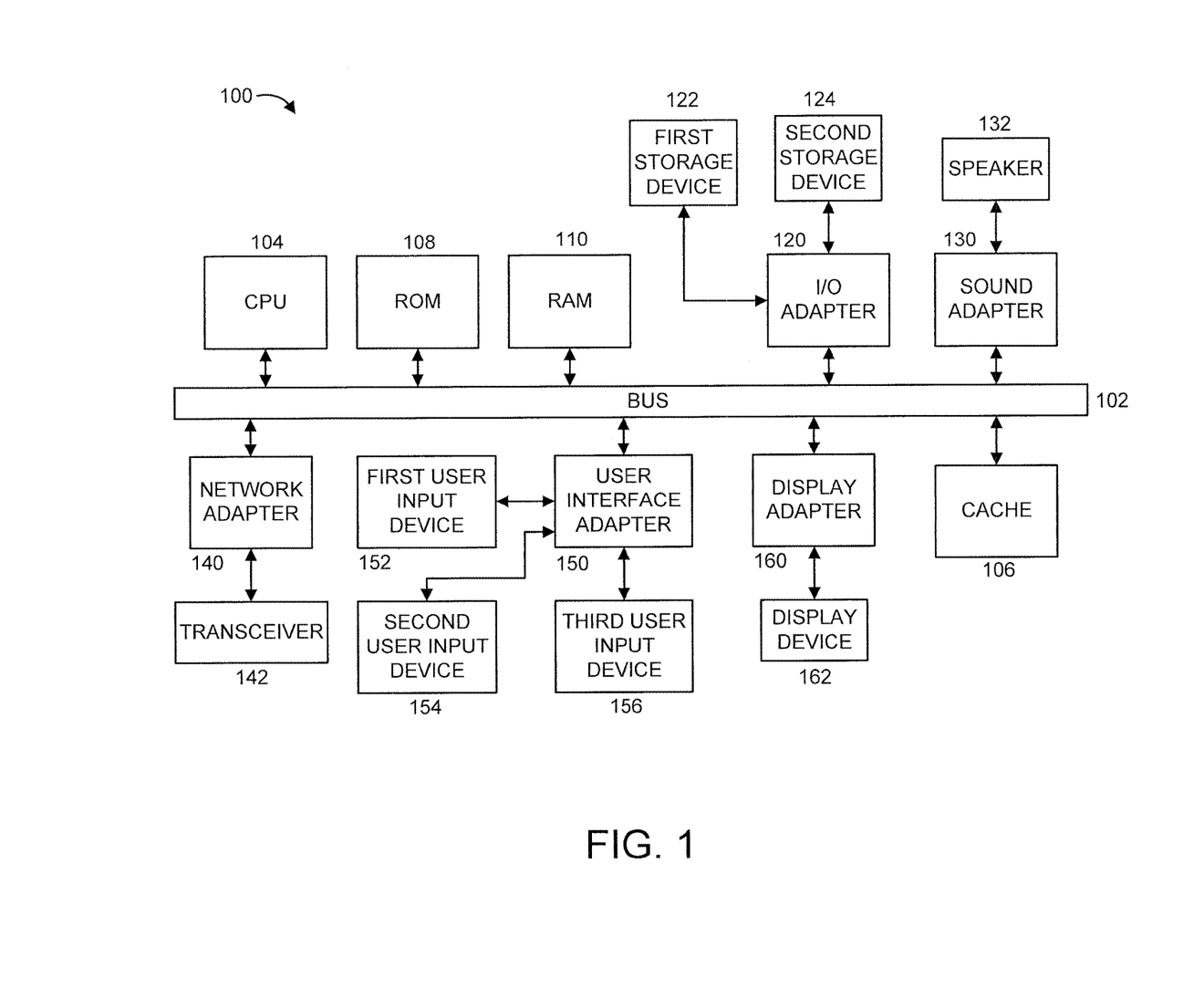
FIG. 1 shows an exemplary processing system to which the present invention may be applied, in accordance with an embodiment of the present invention.

FIG. 1 shows an exemplary processing system 100 to which the present invention may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
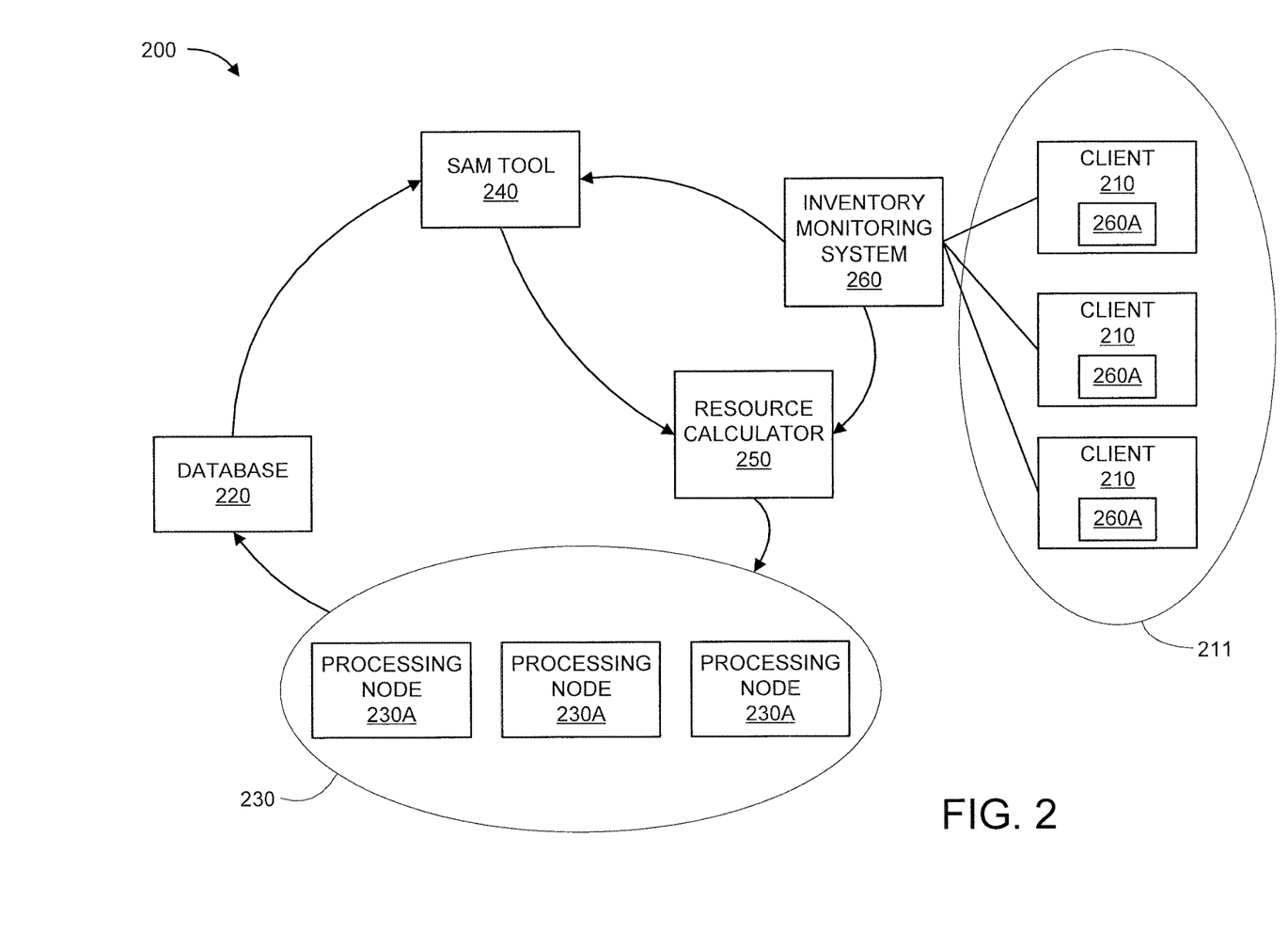
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
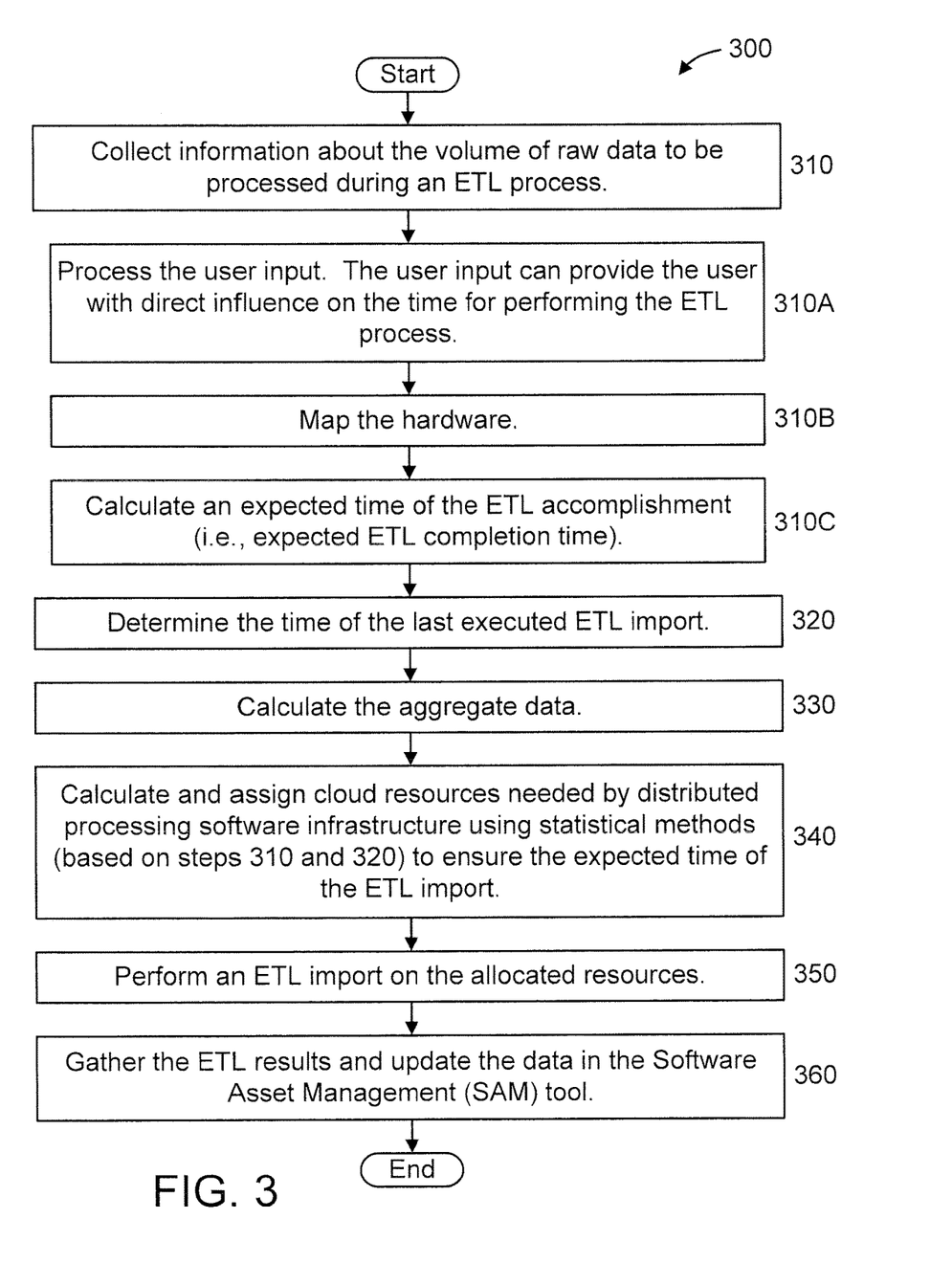
FIG. 3 shows an exemplary method for managing a software asset environment using a cognitive distributed cloud infrastructure, in accordance with an embodiment of the present invention.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary environment 200 to which the present invention can be applied, in accordance with an embodiment of the present invention.

The environment 200 includes a set of clients 210, a database 220, distributed infrastructure resources 230, a software asset management (SAM) tool (also interchangeably referred to herein as "software asset manager") 240, a resource calculator 250, and an inventory monitoring system 260.

The set of clients 210 are part of a network 211. Other elements of the network 211 are not shown for the sake of brevity.

The inventory monitoring system 260 monitors the network 211 including the set of clients 210. Of course, other entities can also be monitored, while maintaining the spirit of the present invention. The inventory monitoring system 260 can be an endpoint monitoring system (such as, e.g., but not limited to, BigFix® Inventory). The items that can be monitored by the inventory monitoring system 260 include, but are not limited to, the number of endpoints, the number of components installed at each of the endpoints, the hardware infrastructure complexity, the software catalog complexity, the scan frequency, the numbers of directories and files, number of installed products, type of bundlings used (confirmed/unconfirmed), the number of unconfirmed bundlings to total (unconfirmed and confirmed) bundlings, type of scoping (computer groups), type of licensing, and so forth. The preceding items are merely illustrative and can vary depending upon the implementation.

The inventory monitoring system 260 can include agents 260A in each of the clients 210 in order to facilitate monitoring of the clients 210.

The SAM tool 240 collects load information about a volume and a complexity of raw data to be processed during a Software as a Service (SaaS) ETL process (hereinafter "ETL process" in short). The SAM tool 240 receives an expected completion time of the ETL process and execution information about (i) hardware resources and (ii) an influence of the hardware resource on an execution time of the ETL process. The SAM tool 240 can receive the preceding information from the inventory monitoring system 260 or determine the preceding information from information received from the inventory monitoring system 260.

The distributed infrastructure resources 230 includes a set of distributed processing nodes 230A implemented in the cloud. The distributed infrastructure resources 230 performs the SaaS ETL on the raw data, in accordance with the present invention.

The database 220 stores the results of the ETL process. The database 220 also stores aggregated data, which can be used to leverage the calculations performed during every new ETL import. In an embodiment, the database 220 is a BigSql database. The database 220 can thus store the raw data that has been subjected to the ETL process, having been extracted from a different source(s), transformed into a form suitable for the database 220, and thereafter saved in database 220.

The resource calculator 250 receives user inputs such as, for example, hardware mapping information, an expected completion time of the ETL, and the time of a last ETL import. The resource calculator 250 calculates resources for the distributed processing software infrastructure 230 to use to perform the ETL process, by applying a statistical method to the load information, the expected completion time, and the execution information. The statistical method can also be applied to any other user inputs. The resource calculator 250 dynamically assigns cloud resources corresponding to and based on the calculated resources, in accordance with the expected completion time. Exemplary statistical methods that can be used include, but are not limited to, mean, simple moving average, standard deviation, self-learning neural networks, and so forth. It is to be appreciated that the present invention are not limited to any particular statistical methods and, thus, any type of statistical method can be used in accordance with the teachings of the present invention, while maintaining the spirit of the present invention.

While one or more elements may be shown as separate elements, in other embodiments, these elements can be combined as one element. For example, in another embodiment, the resource calculator 250 can be combined into a single entity with the SAM tool 240. The converse is also applicable, where while one or more elements may be part of another element, in other embodiments, the one or more elements may be implemented as standalone elements. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 shows an exemplary method 300 for managing a software asset environment using a cognitive distributed cloud infrastructure, in accordance with an embodiment of the present invention.

In an embodiment, method 300 can be used to dynamically allocate resources used by a software framework for distributed storage and processing of very large data sets on computer clusters (such as, for example, Hadoop®), in order to leverage the benefits of a Software as a Service (SaaS) ETL process.

Since the process of optimizing allocation of resources is done in iterations, the following steps represent a selected $n^{th}$ iteration of a method in accordance with an embodiment of the present invention. The method is based on the neural network approach. In each iteration, the attributes/weights are automatically adjusted based on the results obtained from the previous iteration.

At step 310, collect information about the volume of raw data to be processed during an ETL process. In an embodiment, the information is collected from a BigFix® infrastructure. In an embodiment, the information is downloaded from a server or other repository.

In an embodiment, the information about the volume of raw data can include, but is not limited to, one or more of the following parameters: (a) the number of endpoints; (b) the number of components installed on each of the endpoints; (c) the hardware infrastructure complexity, including/involving CPU, RAM, sockets information, virtualization, disk space, and so forth; (d) the software catalog complexity; (e) the scan frequency; and (f) the numbers of directories and files.

In an embodiment, a first run of step 310 can involve using default entries to fulfill user supplied or expected parameters. In an embodiment, subsequent runs of step 310 can involve using an aggregate of one or more of the preceding parameters.

In an embodiment, step 310 includes steps 310A-C.

At step 310A, process the user input. The user input can provide the user with direct influence on the (desirable) time for performing the ETL process.

At step 310B, map the hardware. In an embodiment, step 310B can involve mapping the amount of time required by the hardware to process data of this type.

In an embodiment, step 310B can involve, for example, an eXtensible Markup Language (XML) hashmap with a list of hardware specifications and their influences on ETL time execution. Thus, the user can define the so-called hash map of hardware information that introduces an additional level of customization. In the hash map, the user can define pairs of keys and values such as processor models and their expected ETL time execution in the overall ETL process, respectively. Taking into account that the ETL process is performed in an asynchronous manner and some of the aggregated data may be expected earlier to fulfill the third party business requirements, the customer can define the expected level for some groups of hardware that needs to be calculated in the given timeframe.

At step 310C, calculate an expected time of the ETL accomplishment (i.e., expected ETL completion time).

At step 320, determine the time of the last executed ETL import.

At step 330, calculate the aggregate data. In an embodiment, step 330 can involve, but is not limited to, one or more of the following: (a) number of installed products (bundled with adequate components); (b) type of bundling (confirmed/unconfirmed); (c) period of calculated data; (d) catalog customization volume; (e) type of scoping (computer groups); (f) type of licensing; (g) number and type of contracts; and (h) time of the previous import.

At step 340, calculate and assign cloud resources needed by distributed processing software infrastructure using statistical methods (based on steps 310 and 320) to ensure the expected time of the ETL import. The cloud resources can relate to performing the ETL process as a service in the cloud (e.g., Software as a Service (Saas)).

In an embodiment, the input given by the user is treated as the main condition that needs to be fulfilled regarding step 340. Presuming that the software framework (for example, Hadoop®) has unlimited resources to perform the ETL, by setting a lower ETL time execution, the customer automatically forces an increase in the number of resources that need to be used to perform the ETL. Thus, in the mathematical notation, when the expected ETL time tends to 0, the nR, which represents the number of resources in the software framework, tends to infinity.

Further regarding step 340, having the expectations set, the method 300 assigns default attributes/weights that are specified in scalability guides specific to a given product to the collected raw data and maps them in a ratio (e.g., 1:1) to the number of units allocated in the software framework. For example, the number of endpoints is by default translated into the number of virtual units in the cloud infrastructure with the proportion that for 1000 endpoints we allocate one additional virtual unit in the cloud infrastructure. Similarly, the greater the number of software components that are discovered on the agent, then the greater the number of virtual software framework resources that need to be allocated. In the method 300, it can be presumed that 50 software components are usually discovered on a single endpoint in the asset management IT infrastructure. Of course, other numbers can be presumed. Another raw factor that directly influences the number of virtual software framework units can be the frequency of the hardware/software data collection. The number of scans performed on the endpoints increases the overall total number of raw data that needs to be calculated during the ETL process, so it may have a direct volume relation.

Additionally regarding step 340, the attributes and weights used for a current iteration can be adjusted based on the attributes and weights used for a prior iteration. Moreover, convergence or some other criteria (e.g., meeting a time threshold or resource threshold) can be used to determine which resource assignments are actually implemented. For example, iterating can be ceased upon the elapsing of a predetermined time period (time threshold) or upon consuming a predetermined amount of resources (resource threshold).

Also regarding step 340, the cloud resources that can be assigned include, but are not limited to, computer applications, processing nodes, distributed file systems, and so forth. Different nodes can have different computer applications, processors, distributed file systems, and/or so forth.

At step 350, perform an ETL import on the allocated resources.

At step 360, gather the ETL results and update the data in the Software Asset Management (SAM) tool. In an embodiment, the ETL results are gathered into a BigSql database.

Further regarding step 360, the same gathers the inputs with their corresponding weights and correlates the information in the summary block. In that step, some of the information is also correlated between the inputs themselves such as, for example, the number of endpoints, the scan frequency and the component numbers are strictly related to each other. This is done by the resource allocator summary block. In the end, the resource allocator summary block returns the number of virtual units that needs to be allocated in the Hadoop® infrastructure. If the difference between the ETL complete time and the time of a previous ETL is negative, then the additional number of Hadoop® units will be increased. The increment is of course done in conjunction with other inputs in order to calculate the increment requirement more precisely. Additionally in this step, an update is performed of the consecutive weights of the given inputs. The updating of the weights is done individually for each input and it is done based on the difference between the times of two previous ETL imports expressed in seconds. Presuming that the ETL import (per step 350) is done asynchronously, each group of inputs will include information about the direct influence of the ETL execution time. This will simply imply that if some input volume was not changed in comparison to the two last ETL runs and still has a negative effect on the ETL execution time, its associated weight will be adequately adjusted. As an example, if we have 2000 endpoints in ETL run number 1 and ETL run number 2 but the individual ETL times for this part of the calculation took longer, then this will directly influence that the weight w1 will be increased from 1000 to 1500 (The update of each individual weight may be done based on the pre-defined parameter, in this example by 50%).

Hence, in sum, method 300 can be considered to operate on two dimensions. One dimension relates to the input parameters which are usually expressed by volumes. The second dimension relates to the individual weights that, when correlated with a previous dimension, will have a direct influence on the overall ETL time. With each iteration, the weights can be adjusted while the input parameters are gathered from the asset management system.

Figure 4:
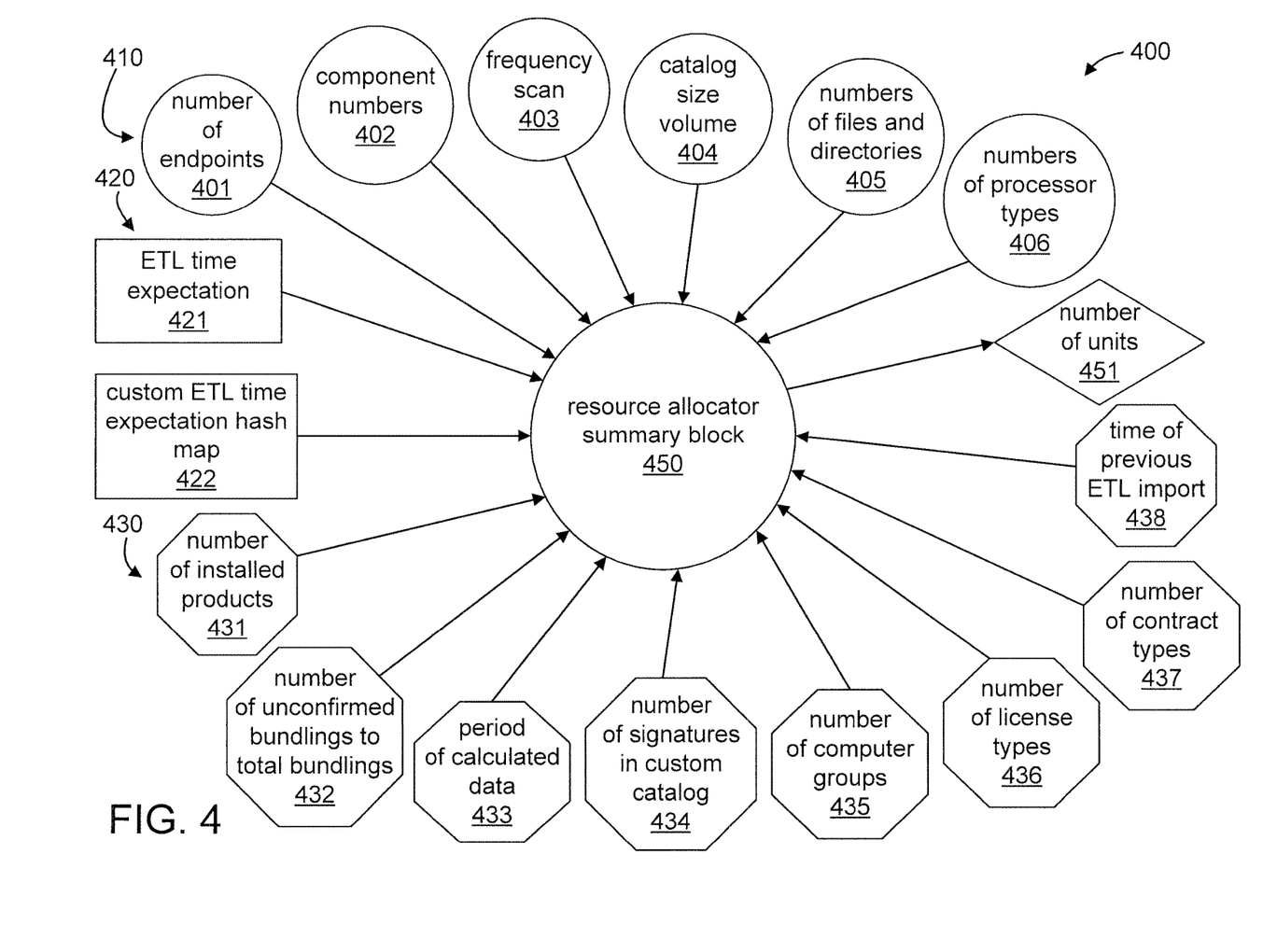
FIG. 4 shows some exemplary parameters to which the present invention can be applied, in accordance with an embodiment of the present invention.

FIG. 4 shows some exemplary parameters 400 to which the present invention can be applied, in accordance with an embodiment of the present invention. In FIG. 4, raw data 410 is represented by circles, user inputs 420 are represented by rectangles, and aggregated data 430 is represented by octagons. The parameters 400 are provided to a resource allocator summary block 450. The resource allocator summary block 450 can be implemented by the resource calculator 250 of FIG. 2. The output from the resource allocator summary block 450 is a number of units 451 represented by a diamond-shaped block.

The raw data 410 includes: number of endpoints 401; component numbers 402; frequency scan 403; catalog size volume 404, number of files and directories 405, and number of processor types (complexity of hardware infrastructure) 406.

The user inputs 420 include: ETL time expectation given in seconds 421; and custom ETL time expectation hash map with values expressed in seconds 422.

The aggregated data 430 includes: the number of installed products 431; the number of unconfirmed bundlings to total (unconfirmed and confirmed) bundlings 432; a period of calculated data (e.g., expressed in number of days) 433; the number of signatures in a custom catalog 434; number of computer groups 435; number of license types 436, number of contract types 437, time of previous ETL import (e.g., expressed in seconds) 438.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
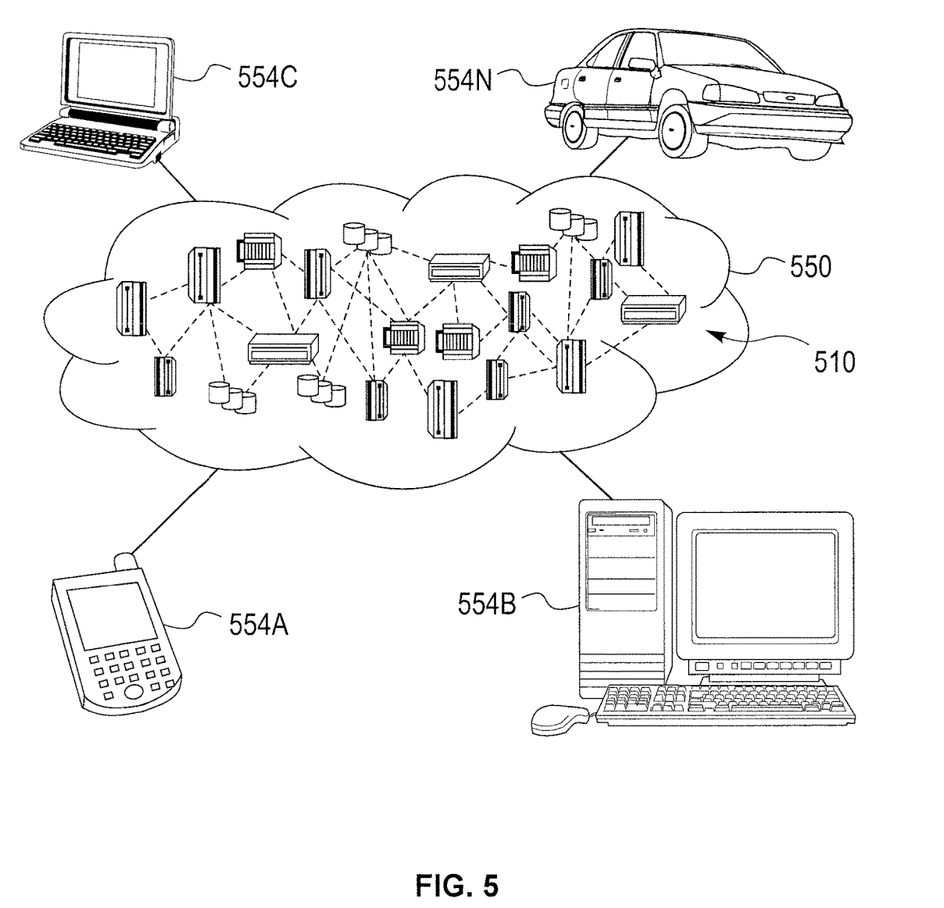
FIG. 5 shows an exemplary cloud computing environment, in accordance with an embodiment of the present invention.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
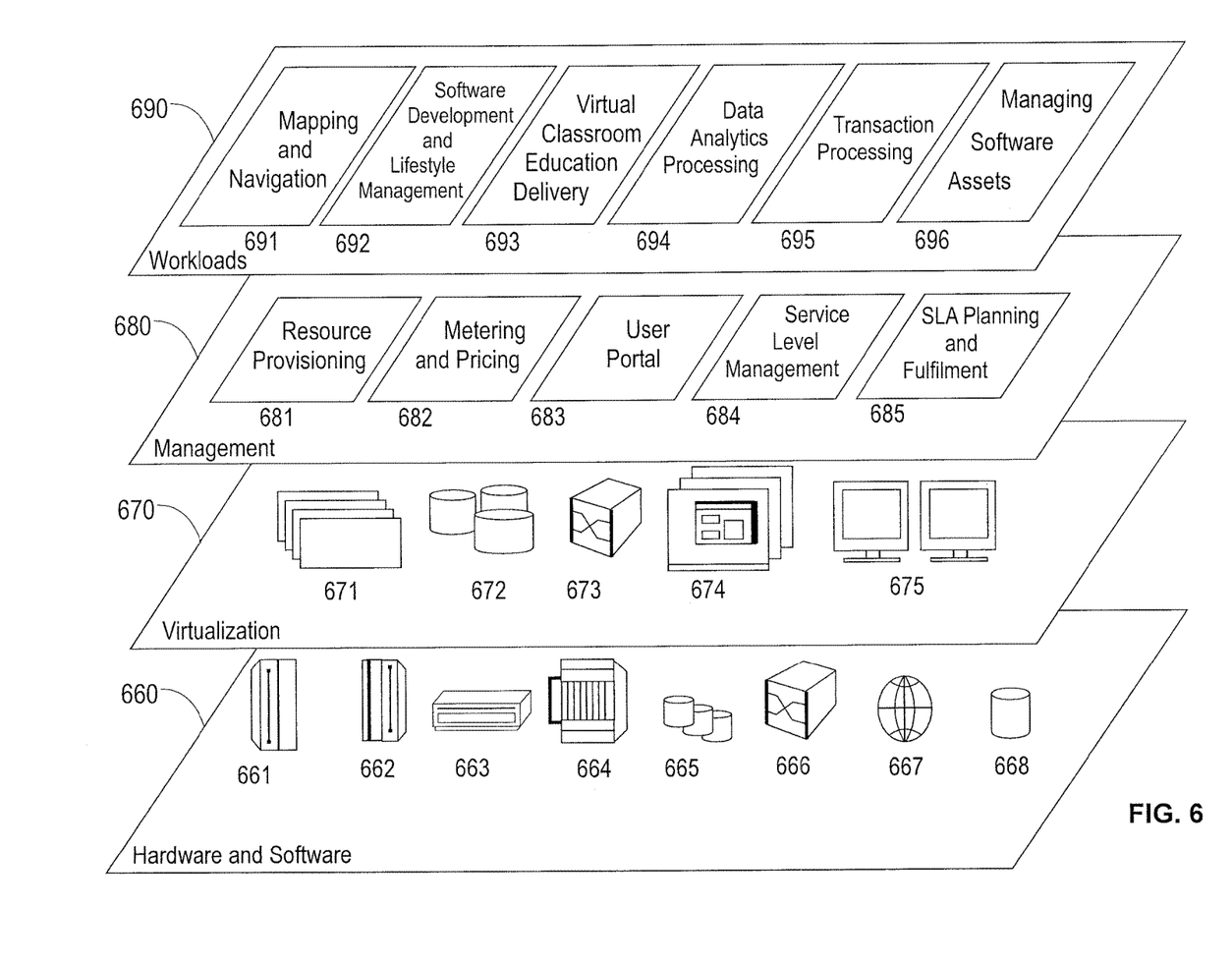
FIG. 6 shows an exemplary set of functional abstraction layers provided by the cloud computing environment shown in FIG. 5, in accordance with an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and managing a software asset environment using a cognitive distributed cloud infrastructure 696.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for performing an extract-transform-load (ETL) process, comprising:
   collecting load information about a volume and a complexity of raw data to be processed during the ETL process;
   receiving an expected completion time of the ETL process and execution information about (i) hardware resources and (ii) an influence of the hardware resources on an execution time of the ETL process;
   calculating, by a processor, resources for a distributed processing software infrastructure to be used to perform the ETL process, by applying a statistical method to the load information, the expected completion time, and the execution information;
   dynamically assigning cloud resources corresponding to and based on the calculated resources, in accordance with the expected completion time; and
   performing the ETL process on the raw data using the assigned cloud resources and storing results of the ETL process in a database.

2. The method of claim 1, further comprising gathering the results of the ETL process and updating a software asset management tool in accordance with the results of the ETL process.

3. The method of claim 1, wherein the load information is selected from the group consisting of a number of endpoints, a number of components installed on each of the endpoints, a hardware infrastructure complexity, a software catalog complexity, a scan frequency, and numbers of directories and files.

4. The method of claim 1, wherein the execution information comprises a user-defined ETL execution time hash map having user defined key pairs, each of the user defined key pairs comprising a processor model and expected ETL execution time for the processor model.

5. The method of claim 1, wherein said assigning step is based on aggregated data selected from the group consisting of a number of installed products, a number of unconfirmed bundlings to total bundlings, a period of calculated data, a number of signatures in a custom catalog, a number of computer groups, a number of license types, and a number of contract types.

6. The method of claim 1, wherein the method is performed on an iterative basis.

7. The method of claim 1, wherein the cloud resources are selected from the group consisting of computer applications, processing nodes, and distributed file systems.

8. The method of claim 1, wherein the ETL process is implemented as a Software as a Service ETL process.

9. The method of claim 1, wherein the expected completion time of the ETL process is received from a user.

10. The method of claim 1, wherein the execution information about the hardware resources is received from a user as a mapping of hardware elements to execution times.

11. The method of claim 1, wherein said assigning step comprises optimizing cloud resource assignments based on at least the load information and the execution information in order to reduce an actual execution time of the ETL process.

12. The method of claim 1, wherein said assigning step comprises optimizing cloud resource assignments based on at least the load information and the execution information in order to meet intended user targets for an actual ETL process execution time and resource consumption.

13. A computer program product for performing an extract-transform-load (ETL) process, the computer program product comprising a computer readable storage medium having program instructions embodied therewith, the program instructions executable by a computer to cause the computer to perform a method comprising:
   collecting load information about a volume and a complexity of raw data to be processed during the ETL process;
   receiving an expected completion time of the ETL process and execution information about (i) hardware resources and (ii) an influence of the hardware resources on an execution time of the ETL process;
   calculating, by a processor, resources for a distributed processing software infrastructure to be used to perform the ETL process, by applying a statistical method to the load information, the expected completion time, and the execution information;
   dynamically assigning cloud resources corresponding to and based on the calculated resources, in accordance with the expected completion time; and
   performing the ETL process on the raw data using the assigned cloud resources and storing results of the ETL process in a database.

14. The computer program product of claim 13, wherein the execution information comprises a user-defined ETL execution time hash map having user defined key pairs, each of the user defined key pairs comprising a processor model and expected ETL execution time for the processor model.

15. The computer program product of claim 13, wherein the ETL process is implemented as a Software as a Service ETL process.

16. The computer program product of claim 13, wherein the expected completion time of the ETL process is received from a user.

17. The computer program product of claim 13, wherein the execution information about the hardware resources is received from a user as a mapping of hardware elements to execution times.

18. The computer program product of claim 13, wherein said assigning step comprises optimizing cloud resource assignments based on at least the load information and the execution information in order to reduce an actual execution time of the ETL process.

19. A system for performing an extract-transform-load (ETL) process, comprising:
  a processor, configured to:
    collect load information about a volume and a complexity of raw data to be processed during the ETL process,
    receive an expected completion time of the ETL process and execution information about (i) hardware resources and (ii) an influence of the hardware resources on an execution time of the ETL process,
    calculate resources for a distributed processing software infrastructure to be used to perform the ETL process, by applying a statistical method to the load information, the expected completion time, and the execution information,
    dynamically assign cloud resources corresponding to and based on the calculated resources, in accordance with the expected completion time; and
  a database configured to store results of the ETL process performed on the raw data using the assigned cloud resources.

20. The system of claim 19, wherein the ETL process is implemented as a Software as a Service ETL process.

* * * * *